H. FRASCH.
APPARATUS AND PROCESS FOR THE SEPARATION AND TREATMENT OF OILS.

No. 190,483.

Patented May 8, 1877.

H. FRASCH.
APPARATUS AND PROCESS FOR THE SEPARATION AND TREATMENT OF OILS.

No. 190,483.

2 Sheets—Sheet 2.

Patented May 8, 1877.

UNITED STATES PATENT OFFICE.

HERMAN FRASCH, OF PHILADELPHIA, PENNSYLVANIA.

IMPROVEMENT IN APPARATUS AND PROCESSES FOR THE SEPARATION AND TREATMENT OF OILS.

Specification forming part of Letters Patent No. 190,483, dated May 8, 1877; application filed December 13, 1876.

*To all whom it may concern:*

Be it known that I, HERMAN FRASCH, of Philadelphia, in the county of Philadelphia and State of Pennsylvania, have invented certain new and useful Improvements in Apparatus and Process for the Separation and Treatment of Oils; and I do hereby declare the following to be a full, clear, and exact description of the invention, such as will enable others skilled in the art to which it pertains to make and use it, reference being had to the accompanying drawings, which form part of this specification.

My invention relates to an improved apparatus and process for the separation and treatment of oils, and well adapted for the treatment of the products of petroleum, though equally well adapted for similar treatment of other oils.

The object of the invention is to remove from any given oil or liquid body the more volatile portions that permeate the mass, and thus increase the density, improve the fire-test, sweeten the odor, or render it inodorous, and otherwise improve its quality.

My invention consists in causing the substance to be treated to be passed in thin films over heated surfaces confined within a flue, and subjected to a current of atmospheric air, and conducting the more volatile portions of the treated substance through condensers and receivers located along the line of draft.

Figure 1:
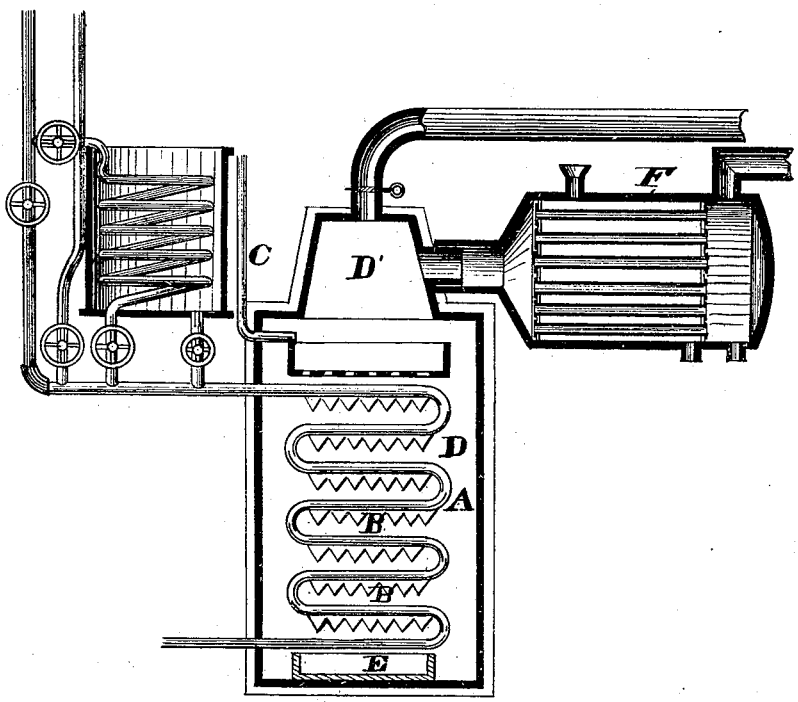
Figure 2:
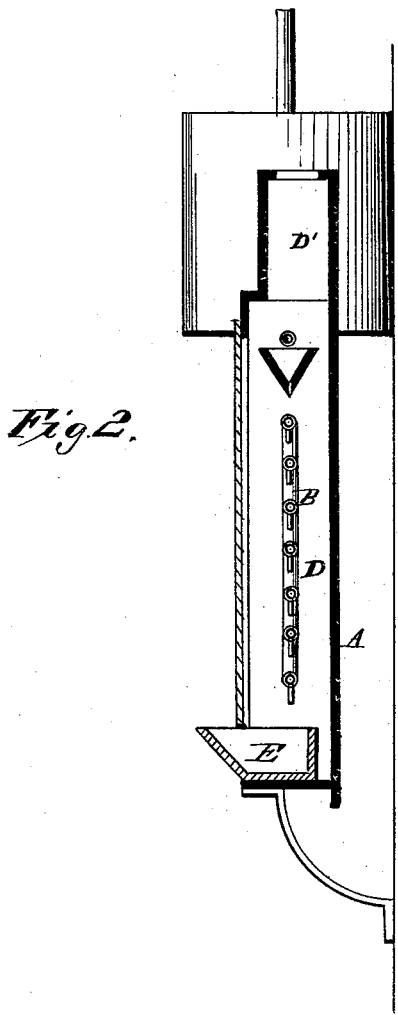

In the drawing, Figure 1 represents, in longitudinal sectional elevation, an apparatus showing the principles of my invention. Fig. 2 is a vertical cross-sectional view of the same in detached part.

A is, preferably, a continuous pipe, with proper return-bends, forming a series of connected horizontal pipes, one above the other, through which steam, water, air, or other fluid may be passed, by means of which the pipe may be kept at proper temperature. B B are serrated drips, or their equivalent, attached to the under side of the horizontal portions of said pipe. C is the pipe through which oil or the substance to be treated is passed from the reservoir to the apparatus. It is provided with a serrated drip, or with small perforations, or other suitable means for distributing the oil upon the pipe A. D is a chamber, which forms a part of an air-flue, D', that may be connected with a high chimney, or any other means for creating a natural or artificial draft. E is a pan, trough, or other suitable basin for collecting the oil at the bottom and conducting it away. This pan E projects forward of the vertical cross-front plane of the close air-chamber D, and is open along its entire horizontal top plane, so that a means of supplying the chamber with external air is thus afforded.

I have found that by treating the oil in the apparatus hereinbefore described, and by the process hereinafter to be explained, that the oil will part with all, or a very much larger than usual portion, of the said volatile products, and that the result will be an oil of a good fire-test, and practically inodorous.

The process consists as follows: The oil to be treated is caused to pass through the pipe C, and in passing from it to be distributed over the several sections of the pipe A. These sections of the pipe A being each provided with drips, the oil will drip from one to the other in its way down, passing over the pipes in very thin films, and in its course becoming thoroughly exposed to the adjacent current of atmospheric air. Through the pipe A I cause steam, water, air, or other material to pass, thereby controlling and regulating the temperature of the pipe, the temperature desired depending entirely upon the quality of the oil to be produced, or the object to be attained. A draft of air, preferably ordinary atmospheric air, though it may be warmed slightly, if desired, is caused to pass up through the flue constantly, thus bearing away with it all the more volatile ingredients of the oil herein set free in the form of vapor or gas. The residual oil is finally collected at the bottom of the chamber in the basin or trough, and is thence conveyed to any proper locality. The draft of air through the flue can, if desired, be led directly to an escape-flue, and be permitted to escape with its burden of vapor and gas; or it may be conducted to the furnace of the steam-boiler, accomplishing the double purpose of stimulating the current of air through the apparatus, and the saving of fuel by burning the vapors thus abstracted from the oil; or, on its passage to an exit-flue, it may be caused to pass through successive condensers and collection-chambers, wherein the more condensable products may be collected and secured, and by the use of superheated steam if necessary in the pipe A, and a series of successive condensers and collection-chambers of proper form, fractional distillation can be very satisfactorily effected.

I have described this process in its application to the fractional distillation of crude petroleum, and the separation and treatment of the products of petroleum, but it is equally applicable in the treatment of other oils which are odorous on account of containing certain volatile ingredients. I do not, therefore, limit myself in its application solely to the treatment of petroleum products.

I would also have it understood that the drawing shows the principle of the apparatus, which may be varied considerably in its construction. Thus, instead of a series of pipes, A, in a vertical flue, they may be so closely connected as to form a corrugated surface, or even a plain surface with a position more or less inclined, the confines of the air-flue being made to correspond. A somewhat porous covering may also be given to these pipes or plates, which would tend to increase the amount of oil-surface exposed to the air-current.

The warming or heating pipes may, if desired, be connected with a water-tank and with water-pipes, as shown at the left in the drawings, in any suitable way, whereby water and steam may pass through the pipes, or steam alone, or water alone.

What I claim is—

1. The within-described process for the separation and treatment of oils, consisting in causing them to pass in thin films over pipes or other heated surfaces, and at the same time exposing them to a confined draft of air, substantially as and for the purpose described.

2. The process for the separation and treatment of oils, consisting of causing them to pass in thin films over heated pipes or other surfaces in contact with an air-draft in an air-flue, and passing the said draft and separated light oils afterward through suitable condensers and receivers, substantially as and for the purpose described.

3. The apparatus for the treatment of oils, consisting of a series of horizontal heating-pipes, whose lower edges are respectively provided with serrated drip-plates and a feed-pipe, the same being relatively arranged within an air-flue having a draft-opening at either extremity, as described, whereby the liquid under treatment may be subjected to a confined draft of external air, substantially as and for the purpose described.

4. The apparatus for the treatment of oils, consisting in the combination, with a vertical series of horizontal heating-pipes, the latter constructed with drip-plates, as described, of an upper feed-pipe, constructed to distribute the liquid over the length of the said series of pipes, and an air-flue, having a draft-opening at either extremity, within which latter the former parts are exposed to a vertical draft of air, substantially as and for the purpose described.

5. The combination, with the serrated pipes A, the feed-pipe C, and the air-flue D, of one or more condensers and receivers, F, substantially as described.

In testimony whereof I have signed my name to this specification in the presence of two subscribing witnesses.

HERMAN FRASCH.

Witnesses:
FRANCIS TOUMEY,
EDWARD WALSH.